(12) United States Patent
Kawasaki (10) Patent No.: US 8,145,689 B2
(45) Date of Patent: Mar. 27, 2012

(54) FOLDER STORAGE DEVICE

(75) Inventor: Shinji Kawasaki, Kyoto (JP)

(73) Assignee: Murata Machinery, Ltd., Kyoto (JP)

( * ) Notice: Subject to any disclaimer, the term of this patent is extended or adjusted under 35 U.S.C. 154(b) by 394 days.

(21) Appl. No.: 12/256,516

(22) Filed: Oct. 23, 2008

(65) Prior Publication Data

US 2009/0182765 A1 Jul. 16, 2009

(30) Foreign Application Priority Data

Jan. 10, 2008 (JP) ................................. 2008-002782

(51) Int. Cl.
*G06F 17/30* (2006.01)

(52) U.S. Cl. ....................................................... 707/829

(58) Field of Classification Search ........................ None
See application file for complete search history.

(56) References Cited

U.S. PATENT DOCUMENTS

| | | | | |
|---|---|---|---|---|
| 6,073,137 | A * | 6/2000 | Brown et al. ........................ | 1/1 |
| 7,409,411 | B2 * | 8/2008 | Sato ..................................... | 1/1 |
| 2002/0056104 | A1 * | 5/2002 | Burnhouse et al. ............. | 725/39 |
| 2004/0177123 | A1 * | 9/2004 | Meek ............................. | 709/206 |
| 2004/0267793 | A1 * | 12/2004 | Sato ............................... | 707/100 |
| 2005/0015410 | A1 * | 1/2005 | Sato ............................... | 707/200 |
| 2008/0250043 | A1 | 10/2008 | Sato | |

FOREIGN PATENT DOCUMENTS

| | | |
|---|---|---|
| JP | 2001-034516 A | 2/2001 |
| JP | 2005-004419 A | 1/2005 |
| JP | 2007-156680 A | 6/2007 |

\* cited by examiner

*Primary Examiner* — Sathyanarayan Pannala
*Assistant Examiner* — Dinku Gebresenbet
(74) *Attorney, Agent, or Firm* — Keating & Bennett, LLP (57) ABSTRACT

A folder storage device includes a folder storage unit which stores folders with hierarchy structures, a first folder hierarchy information generation unit arranged to generate first folder hierarchy information which indicates a related path and a hierarchical location of each folder based on the folders stored in the folder storage unit, a second folder hierarchy information generation unit arranged to generate second hierarchy information which indicates the hierarchical location of each folder based on the first folder hierarchy information, a display unit which displays the second hierarchy information, and a folder update unit in which contents to be updated of the folders stored in the folder storage unit are specified and the updates of the folders stored in the folder storage unit are executed based on the first folder hierarchy information in response to a receipt of update instructions at a prescribed hierarchical location of the second folder hierarchy information.

8 Claims, 10 Drawing Sheets

BEFORE ADDITION OF FOLDERS

FIG. 6

AFTER ADDITION OF FOLDERS (NO SELECTION BUTTONS SELECTED)

FIG. 8
AFTER ADDITION OF FOLDERS (SELECTION BUTTON 51 SELECTED)

AFTER ADDITION OF FOLDERS (SELECTION BUTTON 41 SELECTED)

FOLDER STORAGE DEVICE

CROSS-REFERENCE TO RELATED APPLICATIONS

This application claims priority under 35 U.S.C. 119 to Japanese Patent Application No. 2008-002782, filed on Jan. 10, 2008, which application is hereby incorporated by reference in its entirety.

BACKGROUND OF THE INVENTION

1. Field of the Invention

The present invention relates to a technology which enables a user to easily update folders in a folder storage device arranged to store folders.

2. Description of the Related Art

A folder storage device stores folders and displays folder hierarchy information to a user. The folder hierarchy information indicates a related path and a hierarchical location of each folder. By reference to the folder hierarchy information, the user decides where to update folders in folder hierarchy structures.

A conventional folder storage device groups together folders and puts a name to the group. This enables a user to decide where to update folders in folder hierarchy structures.

Further, a conventional folder storage device displays a thumbnail of a lower folder in an icon of an upper folder. This enables a user to decide where to update folders in folder hierarchy structures.

A conventional folder storage device displays folder hierarchy information to a user. In the below-description, the user updates to add a folder "PRODUCT T" in a lower hierarchy of folders 21, 22, 31 and 32 respectively by reference to the folder hierarchy information illustrated in FIG. 2.

Figure 2:
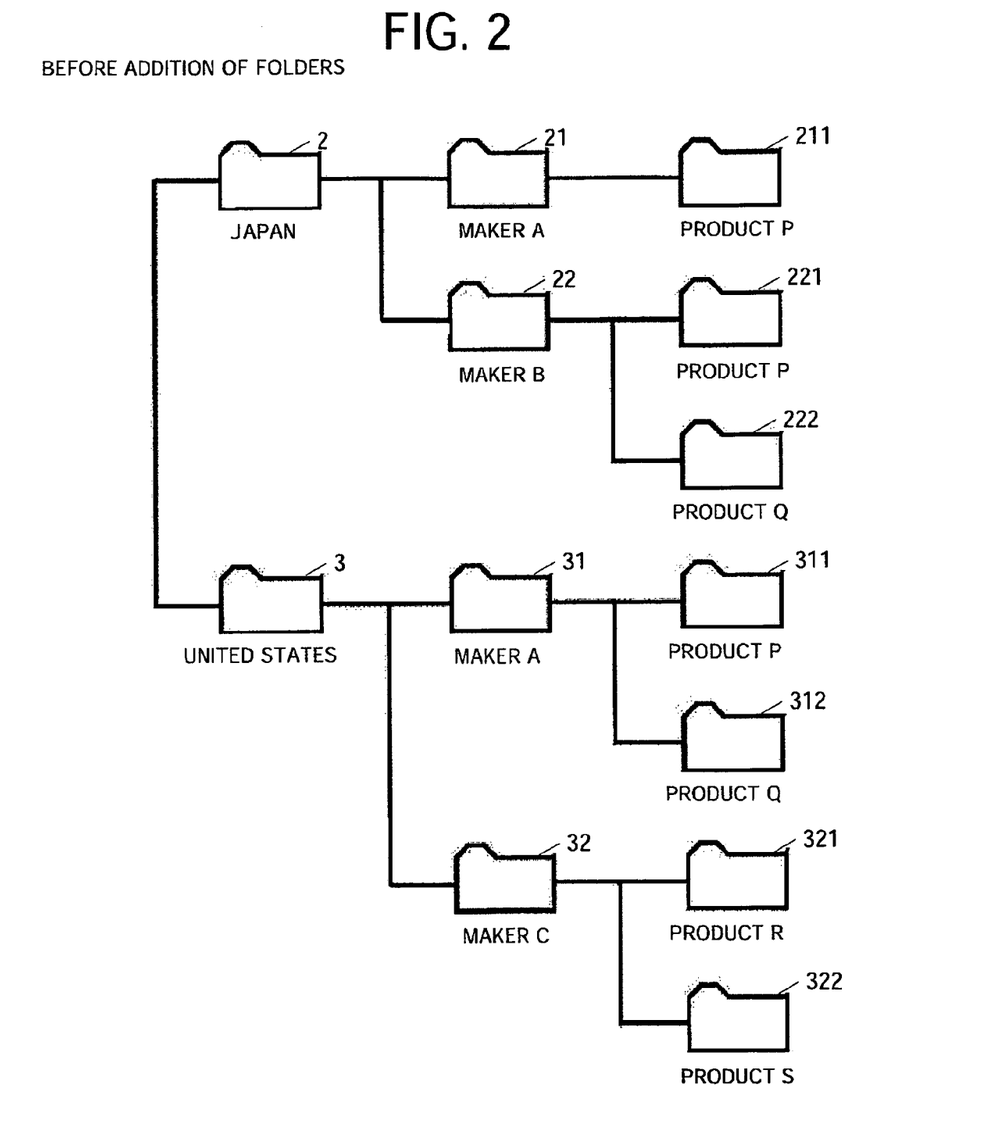
FIG. 2 illustrates a folder configuration before the addition of folders.

Some folder storage devices display folder hierarchy information of each folder hierarchy in the order of upper to lower folders to the user. In this case, the user needs to trace a related path of one folder in the order of upper to lower hierarchy and repeat this same procedure for each of the folders 21, 22, 31 and 32, respectively.

Some folder storage devices display to the user folder hierarchy information of all folder hierarchies. In this case, the user does not need to trace a related path of one folder in the order of upper to lower hierarchy, nor repeat this same procedure for each of the folders 21, 22, 31 and 32, respectively. However, the user cannot easily figure out the related path of each folder 21, 22, 31 and 32 just by looking at the folder hierarchy information.

When the folder storage device stores a small number of folders, the above-mentioned problem does not become readily apparent. However, when the folder storage device stores a large number of folders, the above-mentioned problem becomes obvious.

SUMMARY OF THE INVENTION

Preferred embodiments of the present invention have been developed in consideration of the above-described drawbacks and provide a technology which enables a user to easily update folders in a folder storage device arranged to store folders by reference to folder hierarchy information.

According to a preferred embodiment of the present invention, a folder storage device includes a folder storage unit arranged to store folders with hierarchy structures, a first folder hierarchy information generation unit arranged to generate first folder hierarchy information which indicates a related path and a hierarchical location of each folder based on folders stored in the folder storage unit, a second folder hierarchy information generation unit arranged to generate second hierarchy information which indicates the hierarchical location of each folder based on the first folder hierarchy information, a display unit arranged to display the second hierarchy information, and a folder update unit in which contents to be updated about the folders stored in the folder storage unit are specified and the updates of the folders stored in the folder storage unit are executed based on the first folder hierarchy information in response to a receipt of update instructions at a prescribed hierarchical location of the second folder hierarchy information.

Furthermore, according to preferred embodiments of the present invention, the display unit in the folder storage device includes a division display unit arranged to divide and display each folder in accordance with the hierarchical location, and an update instructions receipt unit arranged to receive the update instructions at each of the hierarchical locations, respectively.

Further, according to preferred embodiments of the present invention, in the folder storage device, the prescribed hierarchical location includes a lower hierarchical location which is lower than the uppermost hierarchical location in the second folder hierarchy information, and the update instructions include lower hierarchy update instructions in a related path of a prescribed folder stored in an upper hierarchical location than the lower hierarchical location.

Also, according to preferred embodiments of the present invention, the display unit in the folder storage device is provided with an emphatic display unit arranged to display the prescribed folder emphatically.

Further, according to preferred embodiments of the present invention, in the folder storage device, the prescribed hierarchical location includes the uppermost hierarchical location in the second folder hierarchy information, and the update instructions include uppermost hierarchy update instructions at the uppermost hierarchy.

According to preferred embodiments of the present invention, the folder storage device generates the first and second folder hierarchy information and displays the second folder hierarchy information to a user. The first folder hierarchy information is ordinary folder hierarchy information which indicates a related path and a hierarchical location of each folder. The second folder hierarchy information is brief folder hierarchy information which indicates the hierarchical location of each folder without indicating the related path of each folder.

The user provides the update instructions at the prescribed hierarchical location by reference to the second folder hierarchy information. When the user provides the update instructions at a hierarchical location other than the uppermost location, the user can choose a folder under which the folders are updated. When the user provides the update instructions at the uppermost hierarchical location, the user can decide to update the folder independently of the other folders in the uppermost location.

The user can easily provide the update instructions at the prescribed hierarchical location by reference to the brief second hierarchy information without reference to the ordinary first hierarchy information.

Other features, elements, processes, steps, characteristics and advantages of the present invention will become more apparent from the following detailed description of preferred embodiments of the present invention with reference to the attached drawings.

DETAILED DESCRIPTION OF PREFERRED EMBODIMENTS

Overall Configuration of a Folder Storage Device

Figure 1:
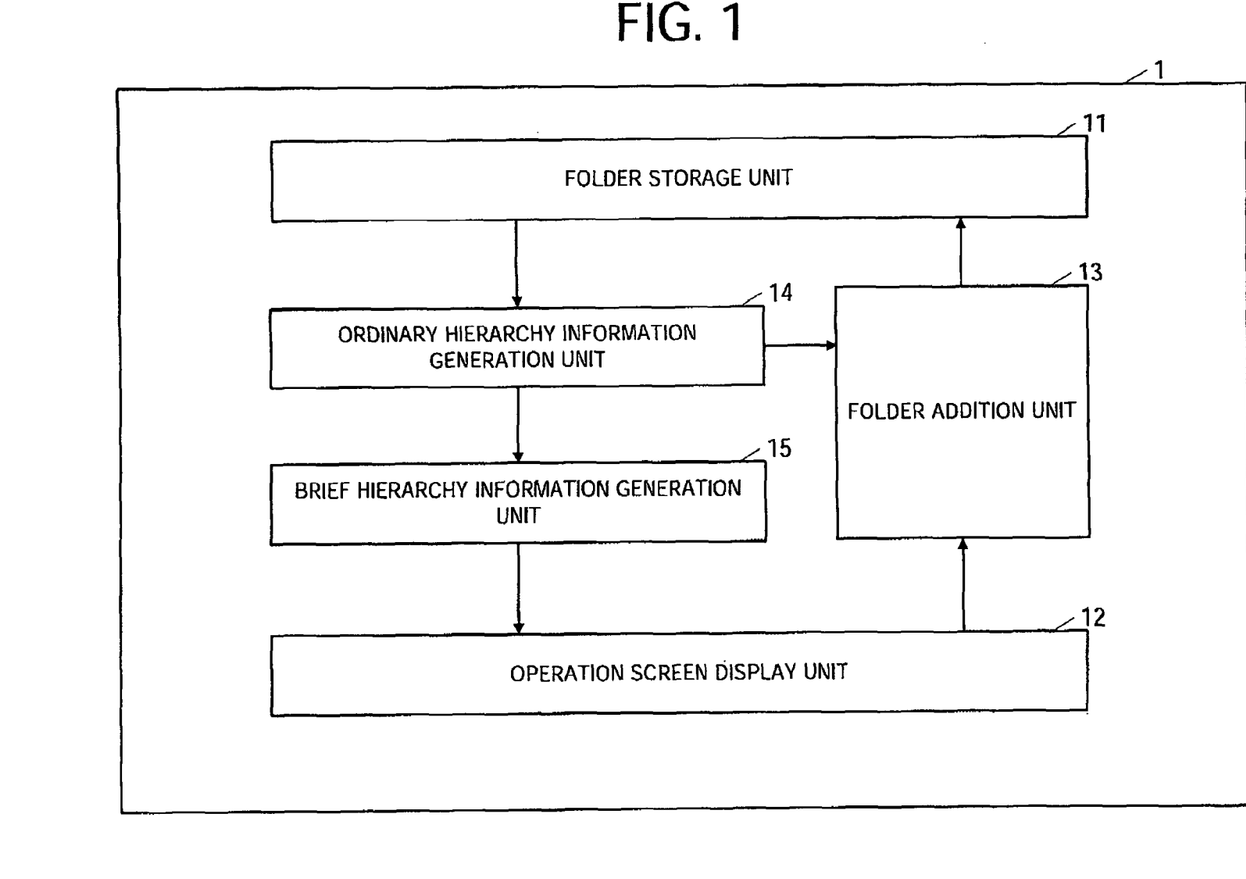
FIG. 1 is a block diagram illustrating an entire configuration of a folder storage device.

With reference to the drawings, preferred embodiments of the present invention will be described. FIG. 1 is an example of a block diagram illustrating an entire configuration of a folder storage device. In the present preferred embodiment, a folder storage device 1 preferably is a digital Multi Function Peripheral. However, the folder storage device 1 can be a personal computer equipped with a folder storage function, a file server, or the like.

The folder storage device 1 is provided with a folder storage unit 11, an operation screen display unit 12, a folder addition unit 13, an ordinary hierarchy information generation unit 14, a brief hierarchy information generation unit 15, and the like.

The folder storage unit 11 is a storage device, such as a memory, a hard disc, or the like. The folder storage unit 11 is arranged to store data in folders as well as folders.

The operation screen display unit 12 is a display device, such as a touch-screen display, and receives instructions such as the addition of folders from a user, as well as displaying various information.

The folder addition unit 13 receives instructions for the addition of folders from the operation screen display unit 12 and adds the folders to the folder storage unit 11.

Figure 6:
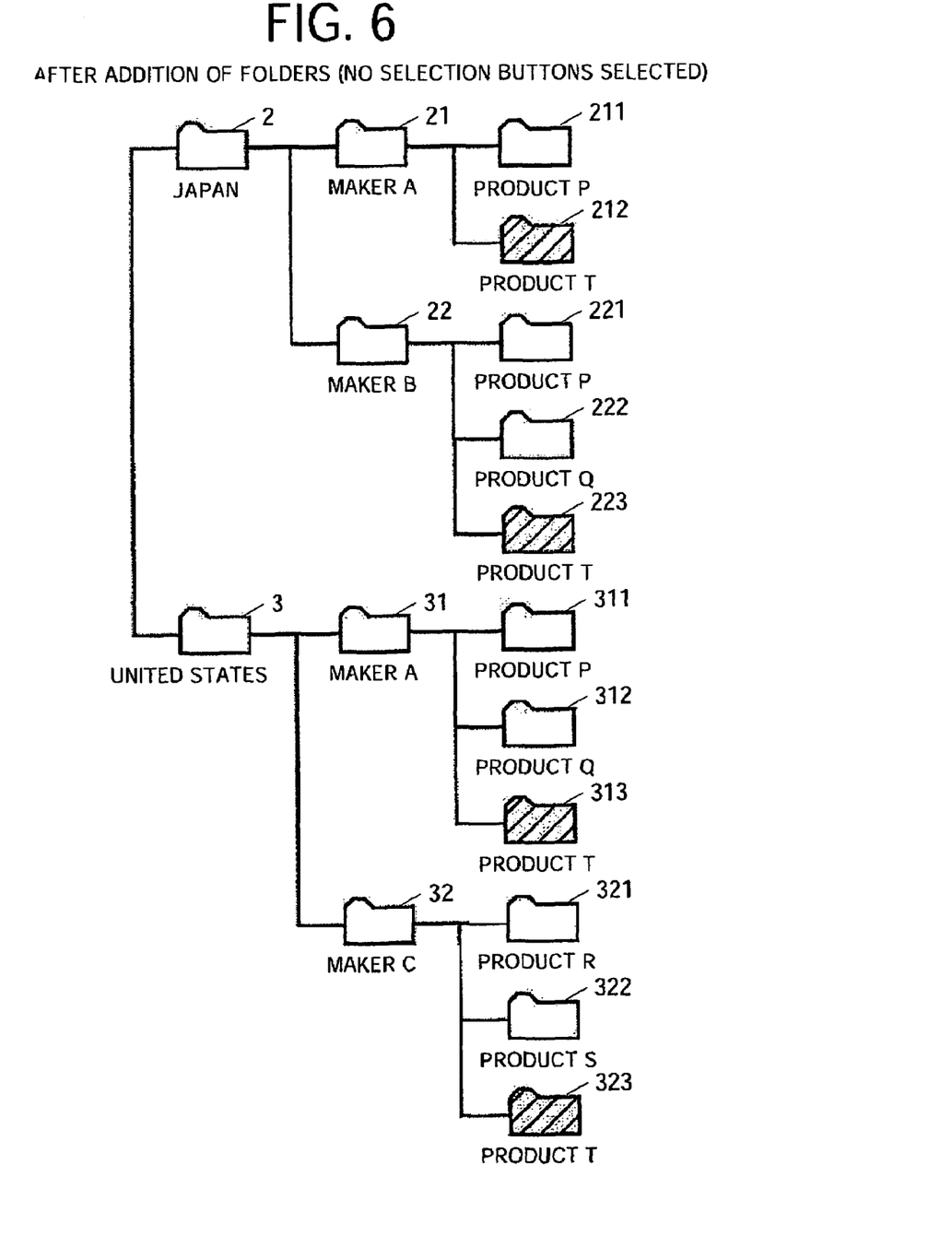
FIG. 6 illustrates the folder configuration after the addition of folders when a selection button is not selected.
Figure 8:
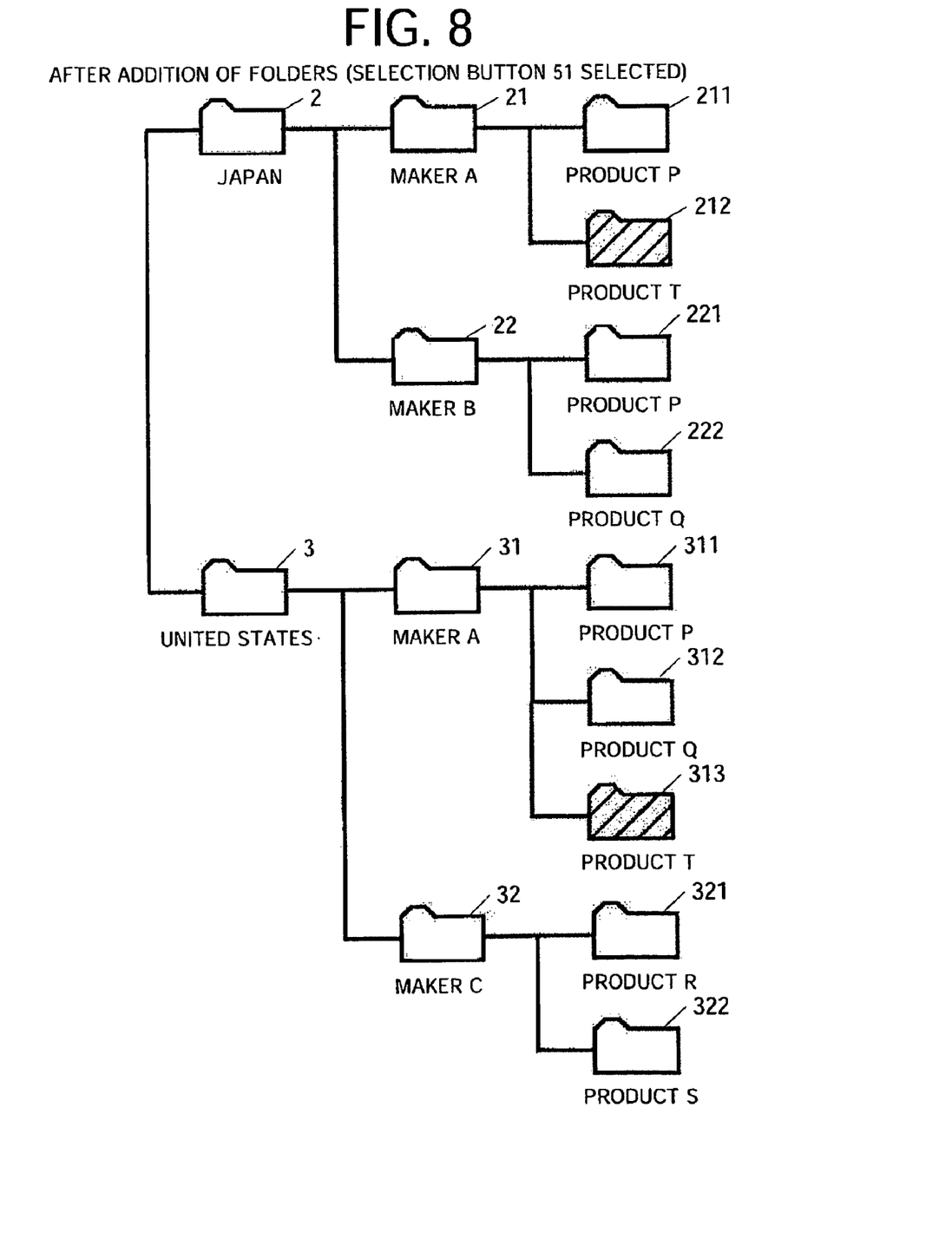
FIG. 8 illustrates the folder configuration after the addition of folders when the selection button "MAKER A" is selected.
Figure 10:
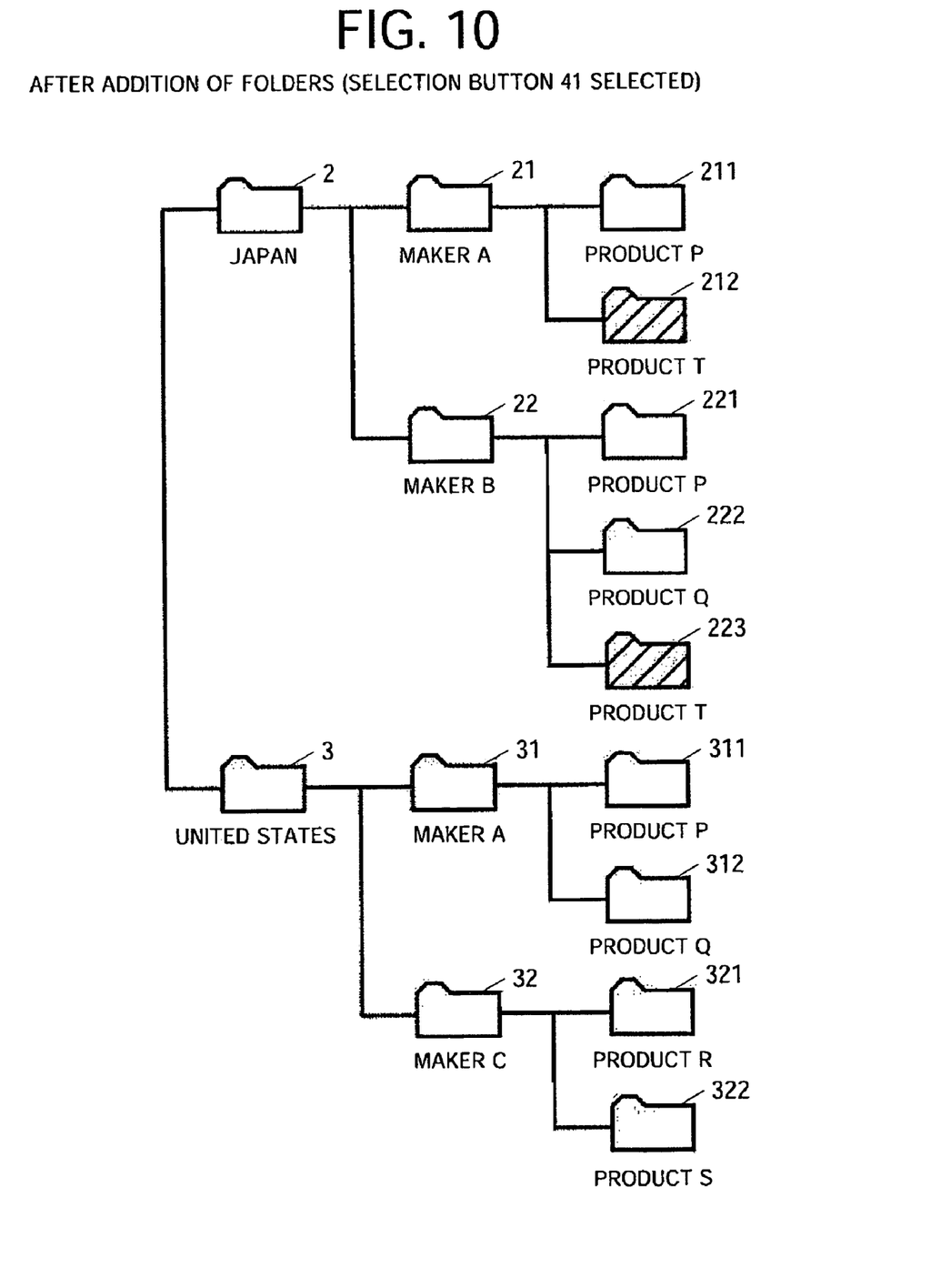
FIG. 10 illustrates the folder configuration after the addition of folders when the selection button "JAPAN" is selected.

The ordinary hierarchy information generation unit 14 generates ordinary hierarchy information based on the folders stored in the folder storage unit 11. The ordinary hierarchy information is ordinary folder hierarchy information illustrated in FIGS. 2, 6, 8 and 10. The ordinary hierarchy information illustrated in FIG. 2 is the ordinary hierarchy information before the addition of folders. The ordinary hierarchy information illustrated in FIGS. 6, 8 and 10 is the ordinary hierarchy information after the addition of folders.

The ordinary hierarchy information includes information which indicates a related path and a hierarchical location of each folder. However, the ordinary hierarchy information is not displayed in the operation screen display unit 12. A specific description is made below of an example of the ordinary hierarchy information as illustrated in FIG. 2.

In the first hierarchy at the uppermost location, a folder 2 "JAPAN" and a folder 3 "UNITED STATES" are stored. In the second hierarchy at the middle location, the folders 21 and 31 "MAKER A", a folder 22 "MAKER B", and a folder 32 "MAKER C" are stored. In the third hierarchy at the lowest location, the folders 211, 221 and 311 "PRODUCT P", the folders 222 and 312 "PRODUCT Q", a folder 321 "PRODUCT R", and a folder 322 "PRODUCT S" are stored.

The ordinary hierarchy information includes information which indicates where in hierarchical locations of folder hierarchy structures each folder exists. For example, information that the folder 2 "JAPAN" exists in the first hierarchy and the folder 21 "MAKER A" exists in the second hierarchy is included.

Furthermore, the ordinary hierarchy information includes information which indicates which folders in lower hierarchical locations are stored in each folder, or which folders in upper hierarchical locations store each folder, as information to indicate a related path of each folder. For example, information that the folder 2 "JAPAN" in the first hierarchy stores the folder 21 "MAKER A" in the second hierarchy is indicated.

When a plurality of folders with the same name exist, information of each of the plurality of folders is respectively included in the ordinary hierarchy information. For example, as the folder "MAKER A", information of two folders in the second hierarchy, i.e., the folders 21 and 31, are included respectively in the ordinary hierarchy information.

Figure 3:
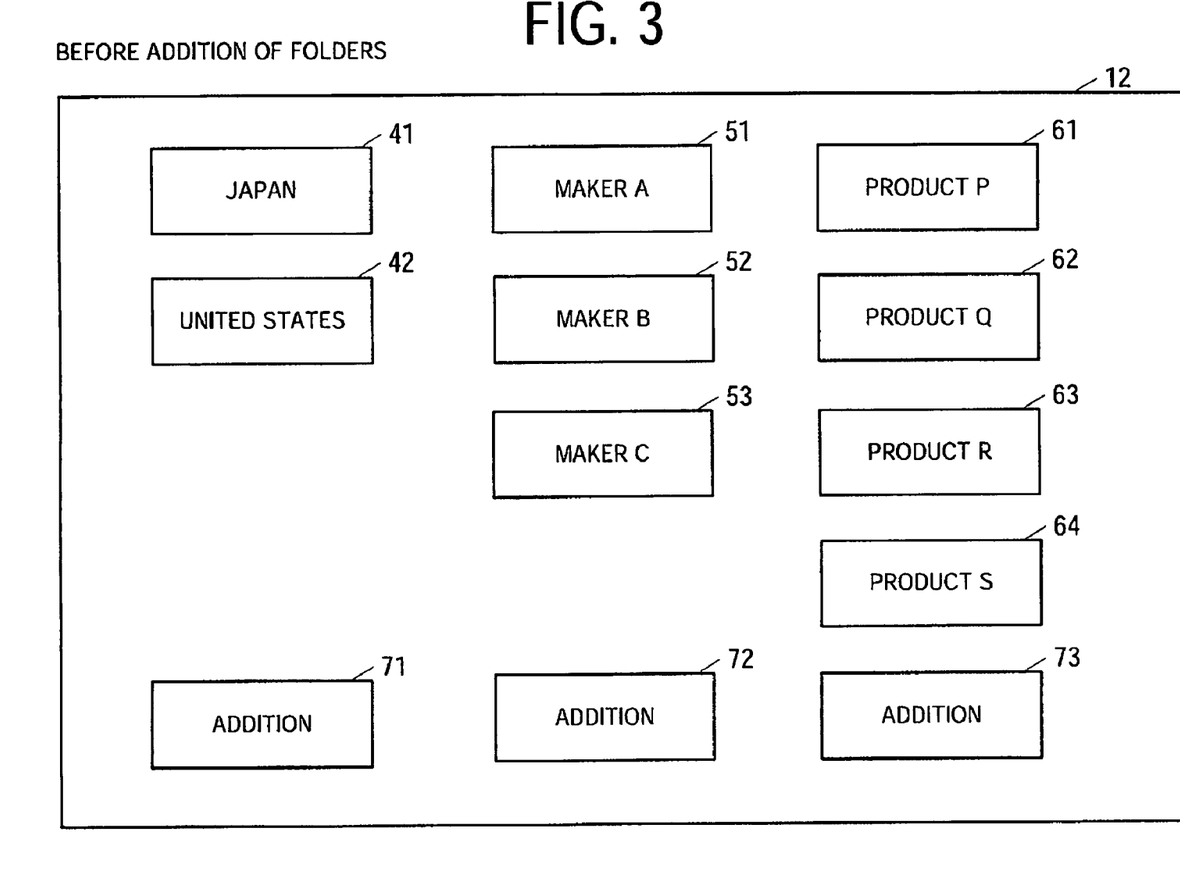
FIG. 3 illustrates an operation screen before the addition of folders.
Figure 4:
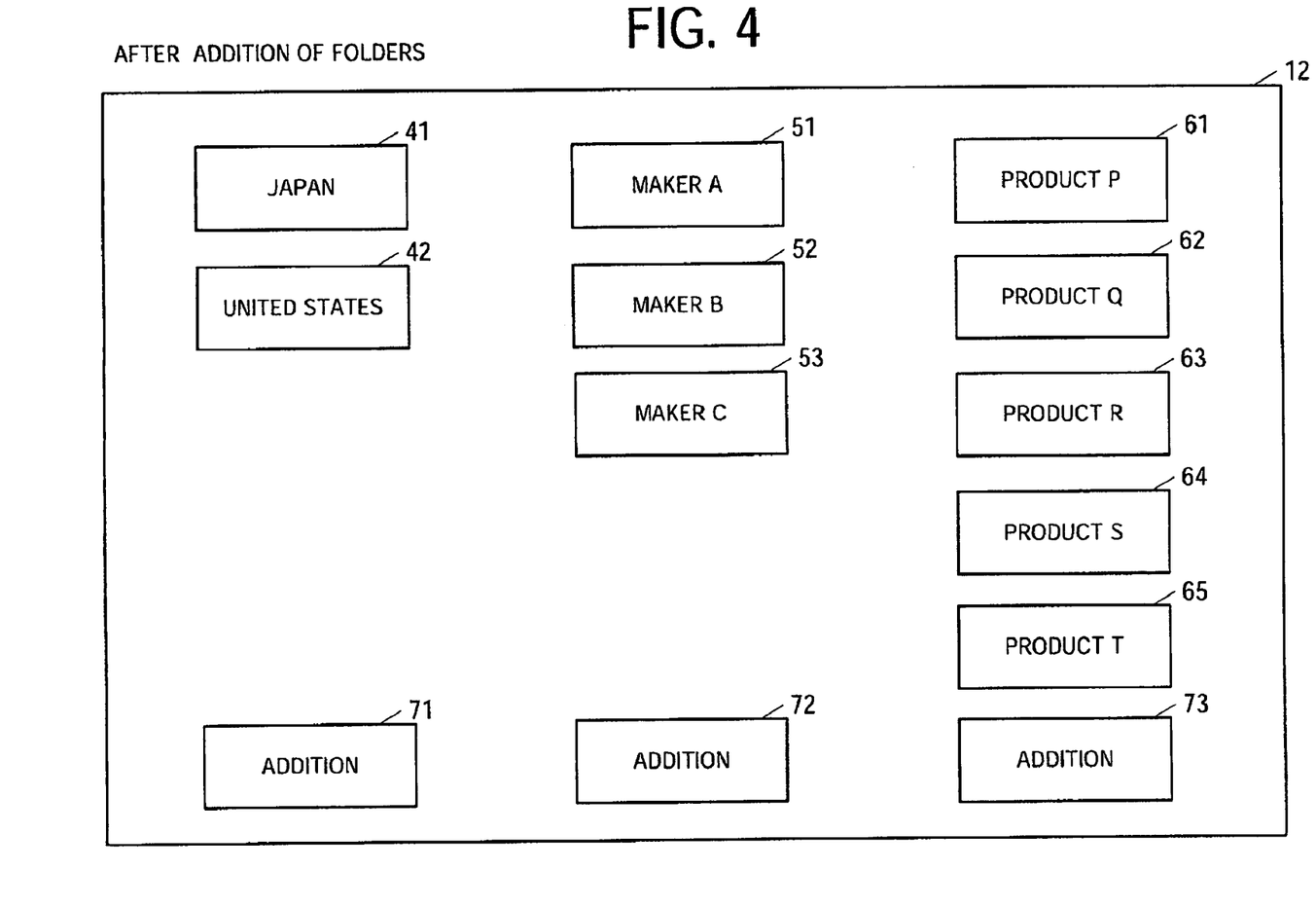
FIG. 4 illustrates the operation screen after the addition of folders.

The brief hierarchy information generation unit 15 generates brief hierarchy information based on the ordinary hierarchy information generated by the ordinary hierarchy information generation unit 14. The brief hierarchy information is brief folder hierarchy information illustrated in FIGS. 3, 4, 5, 7 and 9. The brief hierarchy information illustrated in FIGS. 3, 5, 7 and 9 is the brief hierarchy information before the addition of folders. The brief hierarchy information illustrated in FIG. 4 is the brief hierarchy information after the addition of folders.

The brief hierarchy information includes information which indicates the hierarchical location of each folder. However, the brief hierarchy information does not include information which indicates the related path of each folder. The brief hierarchy information is displayed in the operation screen display unit 12. The brief hierarchy information illustrated in FIG. 3 is specifically described below.

At the far left of the operation screen display unit 12, the folder "JAPAN" is displayed as a selection button 41 and the folder "UNITED STATES" as a selection button 42. In the center of the operation screen display unit 12, the folder "MAKER A" is displayed as a selection button 51, the folder "MAKER B" as a selection button 52, and the folder "MAKER C" as a selection button 53. At the far right of the operation screen display unit 12, the folder "PRODUCT P" is displayed as a selection button 61, the folder "PRODUCT Q" as a selection button 62, the folder "PRODUCT R" as a selection button 63, and the folder "PRODUCT S" as a selection button 64.

The brief hierarchy information includes information which indicates where in hierarchical locations of folder hierarchy structures each folder exists. For example, the folder 2 "JAPAN" is displayed as a selection button 41 at the far left of the operation screen display unit 12. The folder 21 "MAKER A" is displayed as a selection button 51 in the center of the operation screen display unit 12.

However, as information used to indicate the related path of each folder, the brief hierarchy information does not include information which indicates which folders in lower hierarchical locations are stored in each folder, or which folders in upper hierarchical locations contain each folder. For example, information does not clearly indicate that the folder 2 "JAPAN" in the first hierarchy stores the folder 21 "MAKER A" in the second hierarchy.

When a plurality of folders with the same name exist, information of each of the plurality of folders is not included respectively in the brief hierarchy information. For example, as the folder "MAKER A", information of two folders in the second hierarchy, i.e., the folders 21 and 31, is displayed as one selection button 51.

A user decides where to add folders by reference to the brief hierarchy information instead of the ordinary hierarchy information. The folder addition unit 13 executes the process to add folders by reference to the ordinary hierarchy information. This allows the user to give instructions to add the folders easily.

Method to Add Folders

Next, a method which allows a user to add folders is described. As a first example, a method to add folders to the third hierarchy is described. As a second example, a method to add folders to the second hierarchy is described. As a third example, a method to add folders to the first hierarchy is described.

Method to Add Folders to the Third Hierarchy

Figure 5:
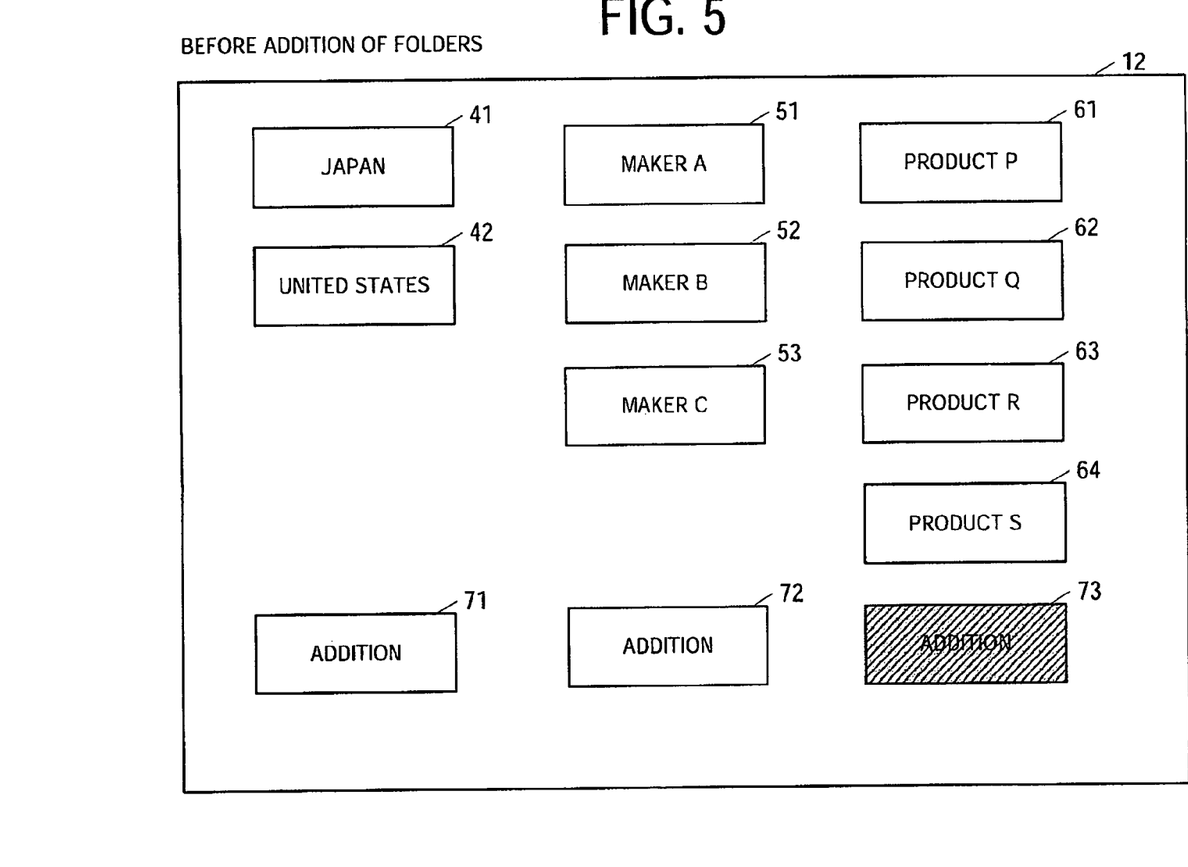
FIG. 5 illustrates the operation screen when a selection button is not selected.
Figure 7:
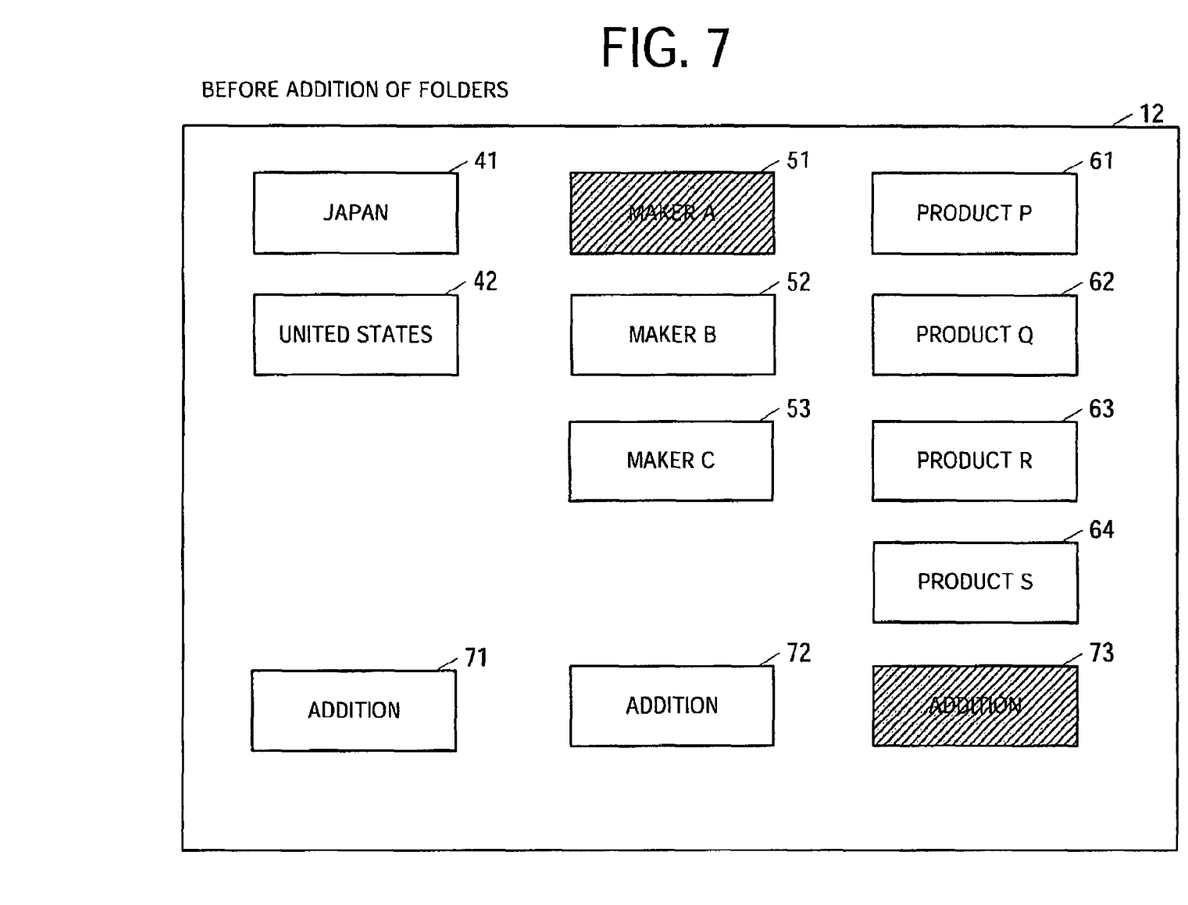
FIG. 7 illustrates the operation screen when the selection button "MAKER A" is selected.
Figure 9:
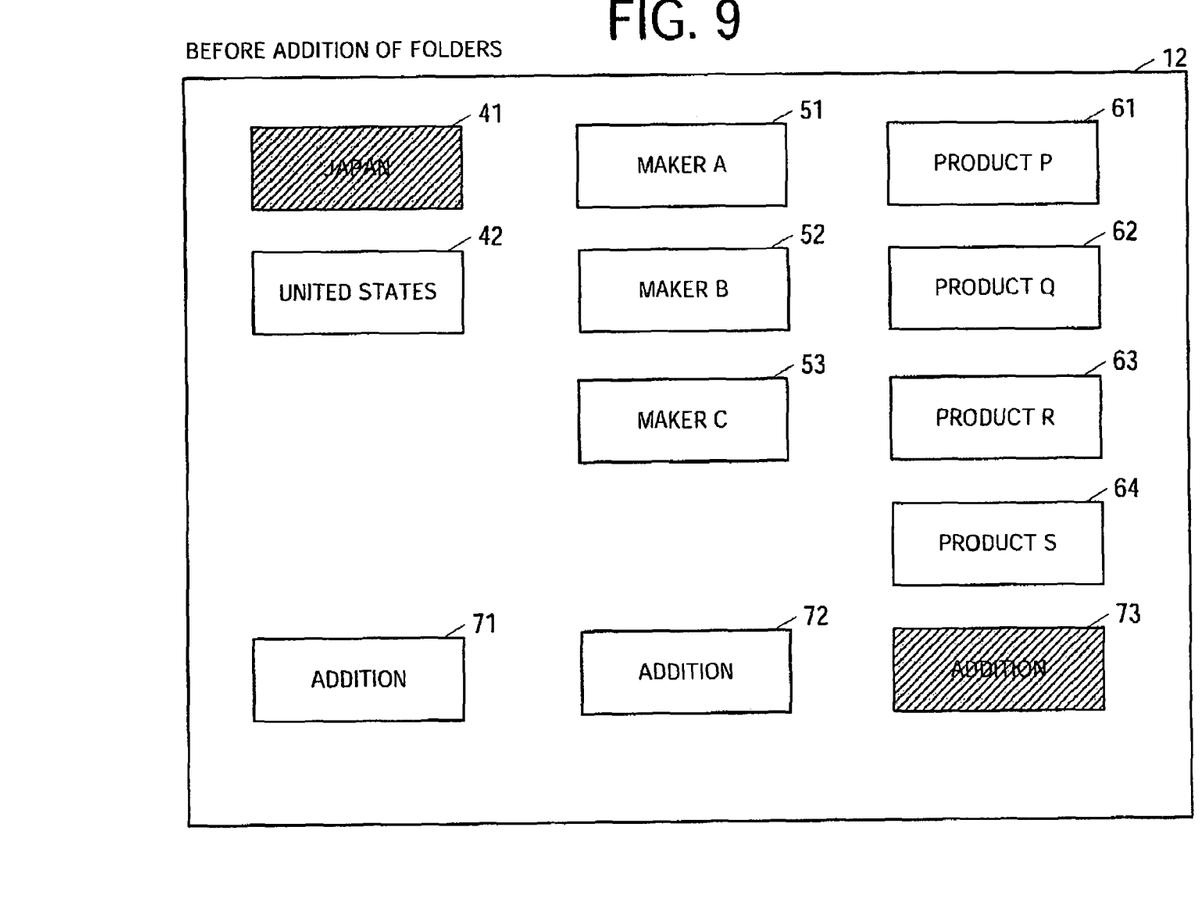
FIG. 9 illustrates the operation screen when the selection button "JAPAN" is selected.

In FIGS. 5, 7 and 9, the operation screen in the case of the addition of folders to the third hierarchy is illustrated. The addition of the folder "PRODUCT T" to the third hierarchy is the same in FIGS. 5, 7 and 9, however, locations in the third hierarchy to which the folder "PRODUCT T" is added are different.

The operation screen illustrated in FIG. 3 is the operation screen before the addition of the folders. The operation screen illustrated in FIG. 4 is the operation screen after the addition of the folders. The operation screen illustrated in FIG. 4 further includes a selection button 65 "PRODUCT T" compared with the operation screen illustrated in FIG. 3. In the cases illustrated in FIGS. 5, 7 and 9, the operation screen after the addition of the folders is illustrated in FIG. 4.

In FIG. 5, a user adds the folder "PRODUCT T" in related paths of all folders stored in the first and second hierarchies.

In the operation screen illustrated in FIG. 5, the user selects an addition button 73 in the third hierarchy. This makes the addition button 73 emphasize its selection by displaying diagonal lines, for example. However, the user does not select selection buttons 41 and 42 in the first hierarchy nor selection buttons 51, 52 and 53 in the second hierarchy.

The folder addition unit 13 is notified by the operation screen display unit 12 that the addition button 73 has been selected. The folder addition unit 13 decides that the folder "PRODUCT T" should be added in the related paths of folders in the first and second hierarchies.

The folder addition unit 13 decides where to add the folder "PRODUCT T" based on the ordinary hierarchy information. The folder addition unit 13 adds the below-described folders "PRODUCT T" in the below-described locations as marked with diagonal lines in FIG. 6:
(1) A folder 212 added to the lower hierarchical location of the folder 2 "JAPAN" and the folder 21 "MAKER A".
(2) A folder 223 added to the lower hierarchical location of the folder 2 "JAPAN" and the folder 22 "MAKER B".
(3) A folder 313 added to the lower hierarchical location of the folder 3 "UNITED STATES" and the folder 31 "MAKER A".
(4) A folder 323 added to the lower hierarchical location of the folder 3 "UNITED STATES" and the folder 32 "MAKER C".

In FIG. 7, the user adds the folder "PRODUCT T" in the related paths of the folders "MAKER A" stored in the second hierarchy.

In the operation screen illustrated in FIG. 7, the user selects the selection button 51 "MAKER A". Then, the user selects the addition button 73 in the third hierarchy. This makes the selection button 51 and the addition button 73 emphasize their selection by displaying diagonal lines, for example.

The folder addition unit 13 is notified by the operation screen display unit 12 that the selection button 51 and the addition button 73 have been selected. The folder addition unit 13 decides that the folder "PRODUCT T" should be added in the related paths of the folders "MAKER A" in the second hierarchy.

The folder addition unit 13 decides where to add the folder "PRODUCT T" based on the ordinary hierarchy information. The folder addition unit 13 adds the below-described folders "PRODUCT T" in the below-described locations as marked with diagonal lines in FIG. 8:
(1) A folder 212 added to the lower hierarchical location of the folder 2 "JAPAN" and the folder 21 "MAKER A".
(2) A folder 313 added to the lower hierarchical location of the folder 3 "UNITED STATES" and the folder 31 "MAKER A".

The user may select the selection button 52 "MAKER B". The folder addition unit 13 adds the folder "PRODUCT T" to the lower hierarchical location of the folder 2 "JAPAN" and the folder 22 "MAKER B".

The user may select the selection button 53 "MAKER C". The folder addition unit 13 adds the folder "PRODUCT T" to the lower hierarchical location of the folder 3 "UNITED STATES" and the folder 32 "MAKER C".

The user may select a plurality of the selection buttons from among the selection buttons 51, 52 and 53. When all of the selection buttons are selected, the effect is the same as the one when none of the selection buttons are selected.

In FIG. 9, the user adds the folder "PRODUCT T" in the related path of the folder "JAPAN" stored in the first hierarchy.

In the operation screen illustrated in FIG. 9, the user selects the selection button 41 "JAPAN". Then, the user selects the addition button 73 in the third hierarchy. This makes the selection button 41 and the addition button 73 emphatically displayed as marked with diagonal lines.

The folder addition unit 13 is notified by the operation screen display unit 12 that the selection button 41 and the addition button 73 have been selected. The folder addition unit 13 decides that the folder "PRODUCT T" should be added in the related path of the folder "JAPAN" in the first hierarchy.

The folder addition unit 13 decides where to add the folder "PRODUCT T" based on the ordinary hierarchy information. The folder addition unit 13 adds the below-described folders "PRODUCT T" in the below-described locations as marked with diagonal lines in FIG. 10:
(1) A folder 212 added to the lower hierarchical location of the folder 2 "JAPAN" and the folder 21 "MAKER A".
(2) A folder 223 added to the lower hierarchical location of the folder 2 "JAPAN" and the folder 22 "MAKER B".

The user may select the selection button 42 "UNITED STATES". The folder addition unit 13 adds the folders "PRODUCT T" in the below-described locations:
(1) the lower hierarchical location of the folder 3 "UNITED STATES" and the folder 31 "MAKER A".
(2) the lower hierarchical location of the folder 3 "UNITED STATES" and the folder 32 "MAKER C".

The user may select both of the selection buttons 41 and 42. When both of the selection buttons are selected, the effect is the same as the one when neither of the selection buttons is selected.

In FIG. 5, the user has not selected any selection buttons from among 41 and 42 in the first hierarchy, nor 51, 52 and 53 in the second hierarchy. In FIG. 7, the user has selected one of the selection buttons from among 51, 52 or 53 in the second hierarchy. In FIG. 9, the user has selected either of the selection buttons, 41 or 42 in the first hierarchy.

The user may select one of the selection buttons from among 51, 52, or 53 in the second hierarchy in addition to selecting either of the selection buttons 41 or 42 in the first hierarchy.

As a first specific example, the user selects the selection buttons of 41 "JAPAN" and 51 "MAKER A". The folder addition unit 13 adds the folder "PRODUCT T" in the lower hierarchical location of the folder 2 "JAPAN" and the folder 21 "MAKER A".

As a second specific example, the user selects the selection buttons of 41 "JAPAN" and 53 "MAKER C". The folder addition unit 13 confirms that the folder 2 "JAPAN" and the folder 32 "MAKER C" are not in the same path. The folder addition unit 13 has the operation screen display unit 12 display that it is impossible to add the folder "PRODUCT T".

Method to Add Folders to the Second Hierarchy

Next, a method to add folders to the second hierarchy is described. In the operation screen illustrated in FIG. 3, a user does not select either of the selection buttons in the first hierarchy, i.e., neither 41 nor 42, or the user selects either one of the selection buttons 41 or 42. Then, the user selects the addition button 72 in the second hierarchy.

First, a description is made of a case in which the user selects neither of the selection buttons 41 and 42. The folder addition unit 13 decides that the folders should be added in related paths of folders in the first hierarchy. The folder addition unit 13 adds the folders in the below-described locations based on the ordinary hierarchy information:
(1) the lower hierarchical location of the folder 2 "JAPAN".
(2) the lower hierarchical location of the folder 3 "UNITED STATES".

Next, a description is made of a case in which the user selects the selection button 41 "JAPAN". The folder addition unit 13 decides that the folders should be added in the related path of the folder "JAPAN" in the first hierarchy. The folder addition unit 13 adds the folders in the lower hierarchical location of the folder 2 "JAPAN" based on the ordinary hierarchy information.

Next, a description is made of a case in which the user selects the selection button 42 "UNITED STATES". The folder addition unit 13 decides that the folders should be added in the related path of the folder "UNITED STATES" in the first hierarchy. The folder addition unit 13 adds the folders in the lower hierarchical location of the folder 3 "UNITED STATES" based on the ordinary hierarchy information.

When the user selects both of the selection buttons 41 and 42, the effect is the same as if neither of the selection buttons 41 and 42 were selected.

Method to Add Folders to the First Hierarchy

Next, a method to add folders to the first hierarchy is described. In the operation screen illustrated in FIG. 3, a user selects the addition button 71 in the first hierarchy.

The folder addition unit 13 decides that the folder should be added independently of the other folders in the first hierarchy. The folder addition unit 13 adds the folder independently of the folder 2 "JAPAN" and the folder 3 "UNITED STATES" based on the ordinary hierarchy information.

Method to Delete Folders

In the above description, the folder storage device 1 adds folders to prescribed hierarchical locations. The folder storage device 1 may also delete folders from prescribed hierarchical locations. The folder storage device 1 may be provided with a folder deletion unit in addition to the folder addition unit 13. The operation screen display unit 12 may be provided with deletion buttons in addition to the addition buttons of 71, 72, and 73.

A description is made below of a method to delete folders from prescribed hierarchical locations when the ordinary hierarchy information is the same as illustrated in FIG. 2 and the brief hierarchy information is the same as illustrated in FIG. 3.

As a first specific example, a description is made of a case in which a user deletes the folder "PRODUCT P" in the third hierarchy. The user selects the selection button 61 "PRODUCT P" and the deletion button in the third hierarchy. The user selects one of the selection buttons in the first hierarchy, i.e. 41 and 42, or in the second hierarchy, i.e. 51, 52 and 53. Or the user selects none of the selection buttons. This allows the user to decide which of the plurality of folders "PRODUCT P" should be deleted.

When the user does not select any of the selection buttons, all of the plurality of folders "PRODUCT P", i.e. 211, 221 and 311 can be deleted. When the user selects the selection button 51 "MAKER A", the folders 211 and 311 can be deleted among the plurality of the folders "PRODUCT P". When the user selects the selection button 41 "JAPAN", the folders 211 and 221 can be deleted among the plurality of the folders "PRODUCT P".

As a second specific example, a description is made of a case in which the user deletes the folder "MAKER A" in the second hierarchy. The user selects the selection button 51 "MAKER A" and the deletion button in the second hierarchy. The user selects either of the selection buttons 41 or 42 in the first hierarchy, or the user selects neither of the selection buttons. This allows the user to decide which of the plurality of folders "MAKER A" should be deleted.

When the user selects neither of the selection buttons, all of the plurality of folders "MAKER A", i.e., 21 and 31, can be deleted. When the user selects the selection button 41 "JAPAN", the folder 21 can be deleted among the plurality of the folders "MAKER A".

As a third specific example, a description is made of a case in which the user deletes the folder "JAPAN" in the first hierarchy. The user selects the selection button 41 "JAPAN" and the deletion button in the first hierarchy. The user can delete the folder 2 "JAPAN".

Summary of Preferred Embodiments

The hierarchy information to which a user refers is the brief hierarchy information illustrated in FIG. 3 instead of the ordinary hierarchy information illustrated in FIG. 2. The ordinary hierarchy information indicates a hierarchical location and a related path of each folder. The brief hierarchy information indicates the hierarchical location of each folder without indicating the related path.

When the user provides update instructions at a hierarchical location other than the uppermost hierarchical location, the user selects or does not select a selection button of the upper hierarchical locations under which the update instructions are given. The user can decide a folder under which the folders are updated.

When the user gives update instructions at the uppermost hierarchical location, the user can decide to update the folder independently of the other folders in the uppermost hierarchical location.

The user can easily provides update instructions of the addition/deletion of folders at any hierarchical locations by reference to the brief hierarchy information without referring to the ordinary hierarchy information.

While the present invention has been described with respect to preferred embodiments thereof, it will be apparent to those skilled in the art that the disclosed invention may be modified in numerous ways and may assume many embodiments other than the preferred embodiments specifically set out and described above. Accordingly, the appended claims are intended to cover all modifications of the present invention that fall within the true spirit and scope of the present invention.

What is claimed is:

1. A folder storage device comprising a processor:
    the folder storage device further comprising;
    a folder storage unit arranged to store folders with hierarchy structures;
    a first folder hierarchy information generation unit arranged to generate first folder hierarchy information including related path information and hierarchical location information of each of the folders stored in the folder storage unit;
    a second folder hierarchy information generation unit arranged to generate second hierarchy information which indicates the hierarchical location information but not the related path information of each of the folders based on the first folder hierarchy information;
    a display unit arranged to display the second folder hierarchy information, when a plurality of folders with the same name exists, information of each of the plurality of folders is not included respectively in the displayed second folder hierarchy information; and
    a folder update unit arranged to specify content of the folders stored in the folder storage system to be updated and to execute updates of the folders stored in the folder storage unit based on the first folder hierarchy information in response to a receipt of update instructions at a prescribed hierarchical location of the second folder hierarchy information; wherein
    the second hierarchy information of folders located at different hierarchical locations is displayed at the same time on the display; and
    the folder update unit is one of a folder addition unit and a folder deletion unit.

2. The folder storage device according to claim 1, wherein the display unit includes a division display unit arranged to divide and display each of the folders in accordance with the hierarchical locations; and
    an update instructions receipt unit arranged to receive the update instructions at each of the hierarchical location respectively.

3. The folder storage device according to claim 1, wherein the prescribed hierarchical location includes a lower hierarchical location which is lower than an uppermost hierarchical location in the second folder hierarchy information; and
    the update instructions include lower hierarchy update instructions in a related path of a prescribed folder stored in an upper hierarchical location than the lower hierarchical location.

4. The folder storage device according to claim 2, wherein the prescribed hierarchical location includes a lower hierarchical location which is lower than an uppermost hierarchical location in the second folder hierarchy information; and
    the update instructions include lower hierarchy update instructions in a related path of a prescribed folder stored in an upper hierarchical location than the lower hierarchical location.

5. The folder storage device according to claim 3, wherein the display unit includes an emphatic display unit arranged to display the prescribed folder emphatically.

6. The folder storage device according to claim 4, wherein the display unit includes an emphatic display unit arranged to display the prescribed folder emphatically.

7. The folder storage device according to claim 1, wherein the prescribed hierarchical location includes an uppermost hierarchical location in the second folder hierarchy information; and
    the update instructions include uppermost hierarchy update instructions at the uppermost hierarchy.

8. The folder storage device according to claim 2, wherein the prescribed hierarchical location includes an uppermost hierarchical location in the second folder hierarchy information; and
    the update instructions include uppermost hierarchy update instructions at the uppermost hierarchy.

* * * * *